United States Patent
Finkbeiner

(12) 
(10) Patent No.: US 6,213,451 B1
(45) Date of Patent: Apr. 10, 2001

(54) LIFTING APPARATUS

(76) Inventor: Gerhard Finkbeiner, Kasernenstrasse 6, D-72250, Freudenstadt (DE)

( * ) Notice: Subject to any disclaimer, the term of this patent is extended or adjusted under 35 U.S.C. 154(b) by 0 days.

(21) Appl. No.: 09/383,037

(22) Filed: Aug. 25, 1999

(30) Foreign Application Priority Data

Sep. 2, 1998 (DE) .............................................. 198 39 835

(51) Int. Cl.[7] .................................................. B66F 3/00
(52) U.S. Cl. ........................................ 254/124; 254/9 R
(58) Field of Search .................................... 254/9 R, 9 B, 254/9 C, 8 R, 8 B, 8 C, 124, 88, 90, 122

(56) References Cited

U.S. PATENT DOCUMENTS

| | | | |
|---|---|---|---|
| 4,447,042 | * | 5/1984 | Masui ..................................... 254/124 |
| 4,899,987 | * | 2/1990 | Craig ..................................... 254/124 |
| 5,048,896 | * | 9/1991 | Channell ............................... 254/124 |
| 5,074,622 | * | 12/1991 | Channell ............................... 254/124 |

FOREIGN PATENT DOCUMENTS

| | | | | |
|---|---|---|---|---|
| 1300656 | * | 8/1969 | (DE) | ..................................... 254/124 |
| 2266656 | * | 8/1969 | (FR) | ..................................... 254/124 |
| 2066773 | * | 7/1981 | (GB) | ..................................... 254/124 |
| 0610785 | * | 6/1978 | (SU) | ..................................... 254/124 |

* cited by examiner

Primary Examiner—Joseph J. Hail, III
Assistant Examiner—Daniel Shanley

(57) ABSTRACT

The invention relates to a lifting apparatus of flat construction for vehicles comprising a first bearing with a rotation axis, a strut arranged to be pivotable around the rotation axis, a carrier arm that has a second bearing in common with the strut; the strut dividing the carrier arm into a first and a second carrier arm section, the second carrier arm section forming a triangle with the strut and the base frame, a guide that has a fourth bearing arranged on the guide for receiving the second carrier arm section, which guide can move back and forth on the base frame, a load receiver arranged on a fifth bearing at a free end of the first carrier arm section, at least one lifting unit that acts on the carrier arm, and a parallelogram guide with which the load receiver is aligned horizontally, in which a resultant force acting on the load receiver runs along a straight line extending between the first and fifth bearings or is situated outside a movement space of the scissors arrangement circumscribed by the first, fourth and fifth bearings.

22 Claims, 7 Drawing Sheets

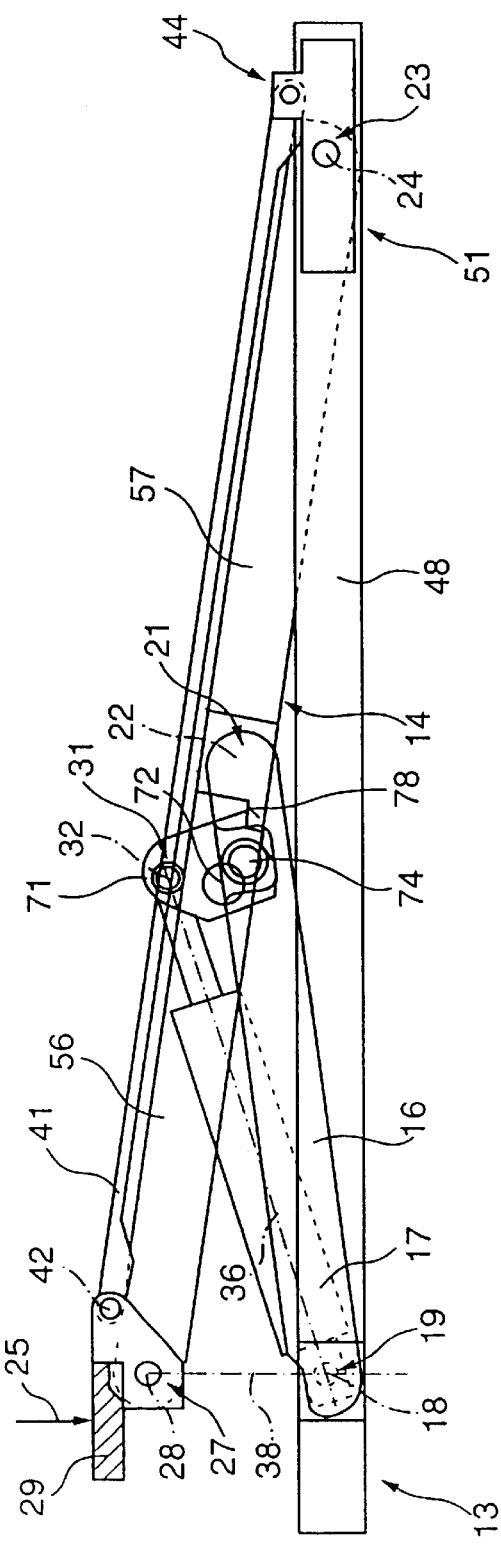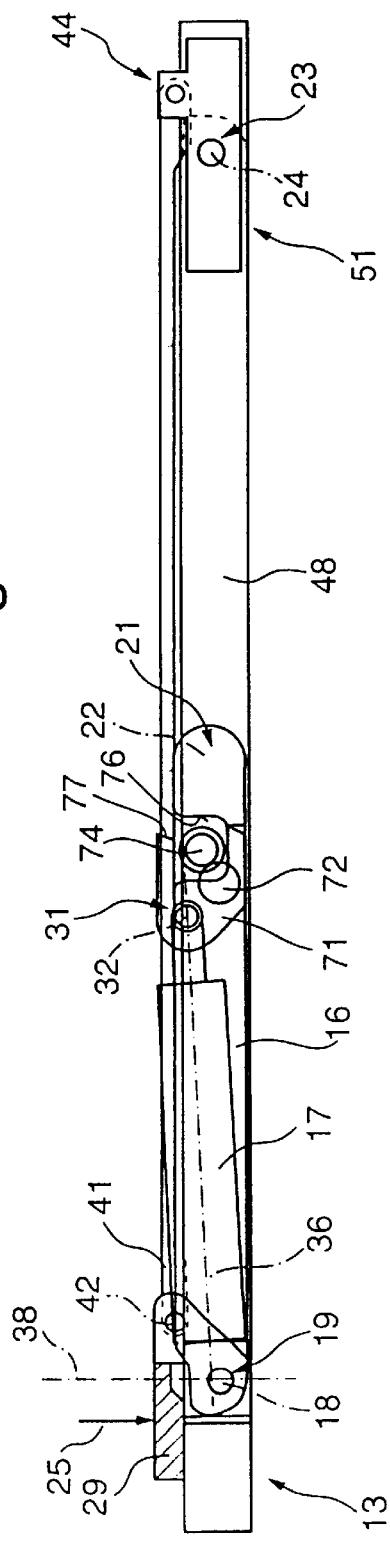

LIFTING APPARATUS

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a lifting apparatus for motor vehicles, mounting units, machines, or the like and more particularly to such a lifting apparatus with at least one scissors arrangement and a base frame.

2. Discussion of Relevant Art

A lifting device is known from a brochure of the OMER Company, and has a base frame with at least one scissor type arrangement. The scissor type arrangement has a first bearing with a pivot axis around which a stationary strut is rotatably arranged. The opposite end of the strut engages a carrier arm and forms a second bearing. The carrier arm is divided by the strut into a first and second carrier arm section, and has a guide at the free end of the second carrier arm, which is associated with the base frame. By means of the guide, the second carrier arm section is guided, movable horizontally back and forth, in the base frame. The carrier arm has, at its end opposite to this, a further bearing at which a load receiver is arranged.

This lifting device is moved up and down by a lifting cylinder, which has one end arranged on the strut near the second bearing, and which acts with its other end on a second strut which in turn is pivotably arranged on the first carrier arm section and is connected to the load receiver. By this arrangement, a double half scissors is formed, which is driven by the lifting cylinder situated in between in order to effect an up and down movement. This arrangement of a lifting platform is constructionally expensive. Furthermore, this lifting apparatus is built high when not in use and is thus inconvenient for use. The lifting apparatus is thus mainly suitable for building into the floor of a workshop. The relative height when not in use is a result of an expensive arrangement of the lifting cylinders which is provided between the struts, so that the required force can be applied in order to move the lifting apparatus out of a dead point position or an unextended position. Constructional measures are employed in order to be able to overcome the high forces, leading to a relatively high construction of the lifting apparatus in an initial position. Furthermore, such an configuration of the lifting apparatus is limited to a few cases of use and is costly in its configuration.

SUMMARY OF THE INVENTION

The invention therefore has as its object to provide a lifting apparatus, which is of simple construction, has favorable force conditions during the whole lifting process, preferably at the beginning of the lifting path, and can be embodied in flat construction. The invention has as a further object to provide a lifting apparatus, which can be used for many uses.

This object is attained, according to the invention, by a lifting apparatus with at least one scissors arrangement and a base frame, having a first bearing with a rotation axis; a strut arranged to be pivotable around the rotation axis; a carrier arm that has a second bearing in common with the strut, the strut dividing the carrier arm into a first and a second carrier arm section the second carrier arm section, forming a triangle with the strut and the base frame; a guide that has a fourth bearing arranged on the guide for receiving the second carrier arm section, which guide can move back and forth on the base frame; a load receiver arranged on a fifth bearing at a free end of the first carrier arm section; at least one lifting unit that acts on the carrier arm; and a parallelogram guide with which the load receiver is aligned horizontally, in which a resultant force acting on the load receiver runs along a straight line extending between the first and fifth bearings or is situated outside a movement space of the scissors arrangement circumscribed by the first, fourth and fifth bearings.

By the constitution of the lifting apparatus according to the invention, it is possible for the lifting apparatus to carry out, on the one hand, a linear lifting movement according to the principle of a punch platform, and can furthermore be designed in a flat construction. The construction according to the invention, in particular of a half scissors, in which the load reception by a parallelogram guide is directed horizontally, makes possible a constructionally simple constitution which can accept considerable forces. Favorable force distributions within the scissors arrangement can furthermore be made possible by the introduction of the force resultant, so that a lifting apparatus can be provided cost-effectively with a low cost in materials.

By the arrangement of a load receiver, which is substantially situated in front of a fifth bearing or outside the movement space between the first, fourth and fifth bearings, an apparatus of flat construction can be provided. The lever arm, which then exists between the force introduction of the resultant force and the fifth bearing, is negligible, and furthermore can be compensated by a pull rod without problems. It can also be provided that the force receiver is situated in the region of the fifth bearing of the scissors arrangement.

According to a further advantageous configuration, it is provided that the parallelogram guide is constructed as a pull rod, so that the lifting movement passes through the fifth bearing of the scissors arrangement. The resultant force, or the load reception, is thereby provided to the fifth bearing in such a manner that exclusively tension forces can act on the pull rod, whereby its design is considerably simplified in contrast to a design for pressure.

A further advantageous configuration provides that the parallelogram guide is constructed as at least one further scissors arrangement with or without a lifting unit, and is coupled to a connecting means which acts on the first scissors arrangement. In this alternative configuration, the pull rod can be dispensed with. Moreover the fifth bearing can run thorough the lifting movement or be anchored fixed to the floor. This further alternative configuration has the advantage that a cost reduction can result from the use of, for example, two scissors arrangements, because of the identity of the components. Maintenance and assembly are also simplified.

By means of an acute angled arrangement of at least one lifting unit to a strut of a scissors arrangement which acts on a carrier arm it is advantageously made possible that favorable force relationships result, particularly when lifting the load from an inoperative position. A dead center position of the lifting unit in an inoperative position of the lifting apparatus can be avoided by this arrangement, and the lifting movement can be carried out with a considerably smaller expenditure of force. At the same time, it can be made possible by this configuration that a flat construction of the lifting apparatus can be provided. When built into a floor or workshop floor, this has the advantage that only minimal foundation work is required. With an arrangement on the floor, such a lifting apparatus of low or flat construction can be traveled over by vehicles without problems. Furthermore, the minimal overall height can lead to a reduction of material costs and thus of the production costs.

According to a further advantageous configuration of the invention, it is provided that a third bearing, which is formed by the action of the lifting unit on the carrier arm, is provided outside an axis between the second and fourth bearings. The lifting cylinder can thereby have a location that deviates from the strut in the inoperative state, thus making it possible for the lifting cylinder to be adjusted by an acute angle in the direction of the lifting movement. The force can thereby be reduced according to a cosine function corresponding to the setting of the angle. In dependence on the size of the cylinder, the adjustment angle can be advantageously adjusted with respect to a horizontal line, so that on the one hand the scissors arrangement is of flat construction in the folded-together state of the lifting apparatus, and on the other hand the use of force is optimized.

According to a further advantageous configuration of the invention, it is provided that at least one lifting unit is arranged, pivotable around the rotation axis of the first bearing. Defined force conditions, which are reproducible in a simple manner, can be provided by means of this configuration. At the same time, a simplification in the constructional configuration can thereby be made possible.

According to a further advantageous configuration of the invention, it is provided that the length of the strut corresponds to the length of the first and second carrier arm sections. This furthermore means that an isosceles triangle is formed between the strut and the second carrier arm section, advantageously during the whole lifting movement, so that advantageous force conditions can be provided. At the same time, it can be made possible by this constructional configuration that a lifting movement which is exclusively perpendicular to the support surface can be attained. The lifting movement of the lifting apparatus according to the invention thus corresponds to that of a punch platform. These have the advantage, among other things, that they spatially require a small space requirement, since no pivoting movement, which can entail additional static problems, arises during the lifting movement.

According to a further advantageous configuration of the invention, it is provided that the pull rod engages at one end on the load receiving means separated from a fifth bearing, and at an opposite end, is rotatably arranged on a lever which is provided, fixed as regards rotation, on the fourth bearing. A so-called parallelogram guide can be provided by this pull rod, so that it is made possible for the load receiving means to maintain a horizontal alignment during the whole lifting and lowering movement. A high degree of safety can thereby be provided during the upward and downward movement of loads by the lifting apparatus.

According to a further advantageous configuration of the invention, it is provided that the scissors arrangements can be used singly for the configuration of a lifting apparatus, or for example used pairwise, mutually opposite. In one configuration, two lifting units can advantageously be used. A reduction of the size of the lifting unit can be given because of the reduction of the force to be applied per lifting unit, so that a further reduction of the overall height of the lifting apparatus in the inoperative state can be made possible.

It is advantageously furthermore provided that the base frame can be constructed as a rail. In this embodiment, the scissors arrangement is turned through 180°, for example, so that the load receiving means is supported on the floor and the surface of the base frame situated opposite the scissors arrangement is constituted as a parking surface, for example, for motor vehicles.

Independently of the use of the base frame, the arrangement according to the invention can be used for motor vehicles, for example, with a total weight, or weight including a load thereon, of less than 7.5 tons.

According to a further advantageous configuration of the invention, it is provided that the second, fourth and fifth bearings, which are provided on the carrier arm, lie in a common plane. A constructionally simple and stable configuration of the carrier arm and also a flat constructional arrangement can thereby be made possible.

It is provided according to a further advantageous configuration of the invention that the base frame has a frame of U-shaped construction, the two opposed, mutually parallel legs of which are preferably of U-profile form and arranged facing each other so that a guide block can be arranged therein. The guide block can also be constructed as a sliding bearing. It is made possible by the rotation axes of two guide rollers advantageously not being situated in a common horizontal plane, for the guide block to be guided in the profiled legs without play, or nearly without play. The guide rollers advantageously have their rolling surface adjusted to the profiling of the U-shaped legs, so that on the one hand a large contact surface is provided to receive the forces, and on the other hand, low-friction rolling conditions can be made possible.

According to a further advantageous configuration of the invention, it is provided that the fourth bearing is arranged between the guide rolls of the suspension, and is preferably movable back and forth on the same horizontal plane during the whole lifting movement. This horizontal plane is advantageously provided nearer to the floor than the rotation axes of the guide rollers. It can thereby furthermore be provided that the guide rod, which is arranged on the fourth bearing by means of a pivot lever, can be arranged flat to the carrier arm.

According to a further advantageous configuration of the invention, it is provided that the carrier arm is constituted as a closed frame that has a right and a left carrier arm strut which are fixedly, mutually spaced apart at the third and fourth bearings by connecting elements, and which has a crossyoke as load-receiving means in the fifth bearing. The connecting elements are of rigid construction and increase the stiffness of the carrier arm, particularly in the region of the third bearing. The crossyoke of the carrier arm is advantageously adjustable to the circumstances of use at any given time. The closed frame makes possible a closed flow of force, so that a design which reduces weight and material can be given, with the same lifting force and stiffness of the frame.

According to a further advantageous configuration of the invention, it is provided that the lifting unit acts on the carrier arm indirectly, preferably via an interposed rotary lever. It can thereby be made possible that, particularly at the beginning of the lifting movement, a reduction of the required force can be attained due to the additional lever ratio, in order to lead the lifting apparatus out of an inoperative position, since the force conditions are relatively unfavorable particularly at the beginning of the lifting movement. The rotary lever advantageously has a relatively longer lever arm to its bearing on the carrier arm, with the lifting unit engaging its end. A substantially oppositely situated lever arm, which is of shorter construction, is provided with a pressure roller which in its turn engages the strut. Thus at the beginning of the lifting movement, a raising of the load receiver is made possible is made possible by the rotary movement of the rotary lever. After a certain lifting path has been traveled, it is advantageously provided that the rotary motion is blocked by a stop provided on the rotary lever, so that the further lifting movement can subsequently take place by the lifting cylinder extending. The pressure roller of the rotary lever can lift from the strut during the further extension, so that the lifting movement is effected exclusively by the lifting cylinder.

BRIEF DESCRIPTION OF THE DRAWINGS

Particularly advantageous embodiment are set forth in the following description taken together with the drawings, in which:

FIG. 5 shows a schematic side view of an alternative embodiment of the invention, in a partially extended position.

FIG. 6 is a schematic side view of the embodiment according to FIGS. 4 and 5 in inoperative position.

DETAILED DESCRIPTION OF PREFERRED EMBODIMENTS

Figure 1:
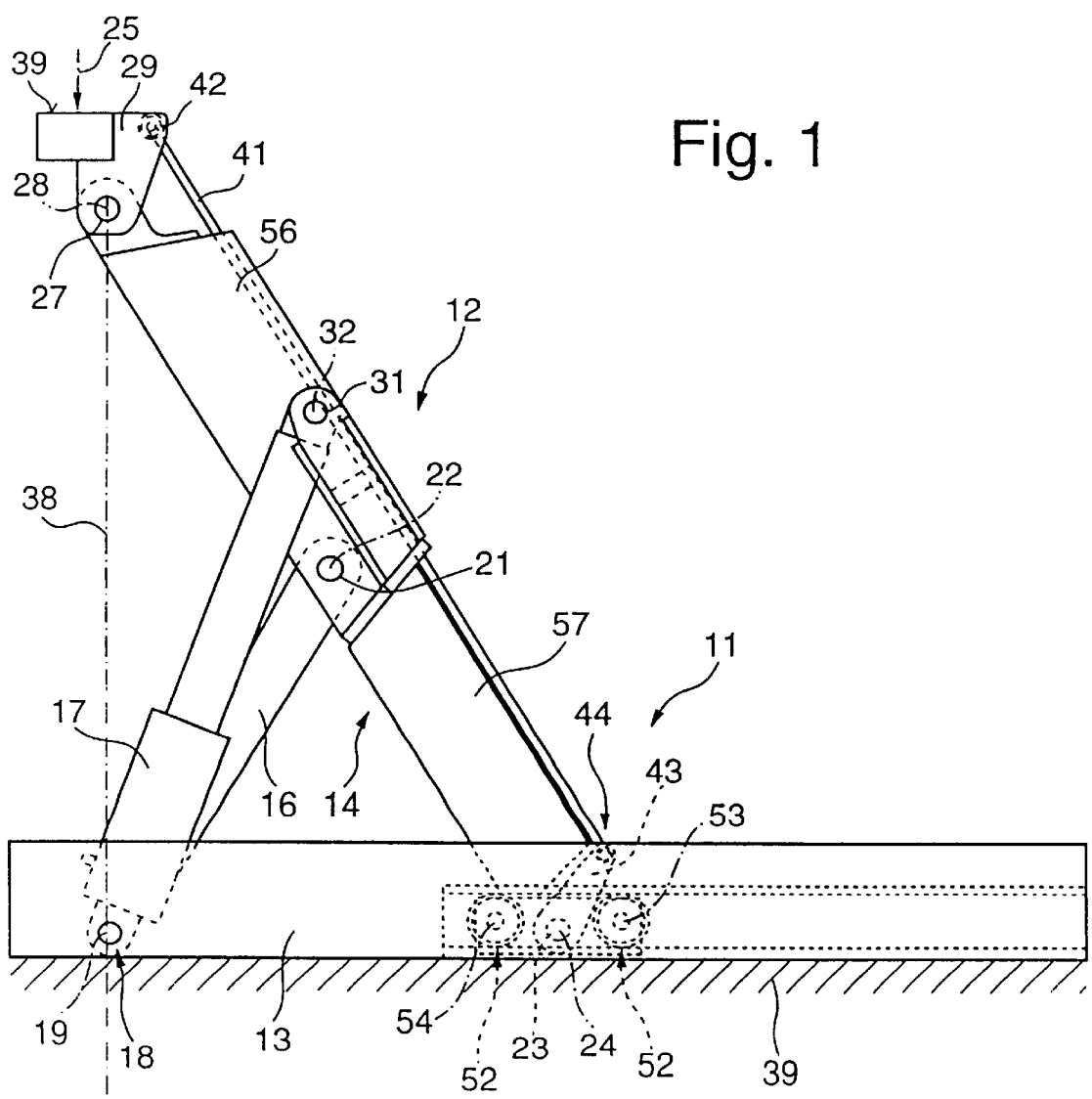
FIG. 1 shows a schematic side view of the lifting apparatus according to the invention, in an extended position.
Figure 2:
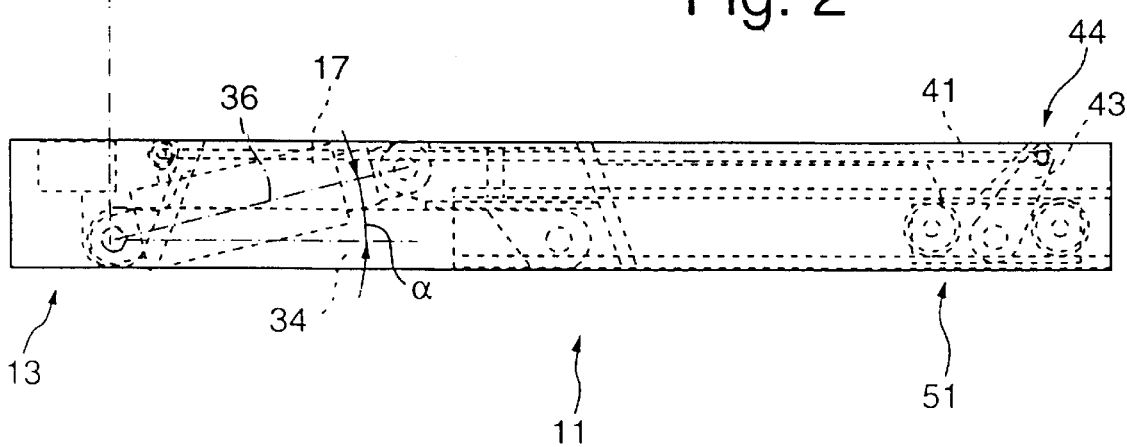
FIG. 2 shows a schematic side view of the lifting apparatus according to the invention, in an inoperative position.

FIG. 1 shows a schematic side view of the lifting apparatus 11 according to the invention, in an extended position. In FIG. 2, the lifting apparatus 11 is shown in an inactive position or in an inoperative position. The lifting apparatus 11 is constructed as a half scissors and has a scissors arrangement 12 which is provided on a base frame 13. The scissors arrangement 12 has a carrier arm 14 which can be transferred by means of a strut 16 and a lifting unit 17 from an inactive position into an extended position. The strut 16 is positioned at a first bearing 18, which is preferably constituted as a fixed bearing, around a rotation axis 19 allocated to the first bearing 18. The connection between an end of the strut 16 opposing the first bearing 18 and the carrier arm 14 is formed by a second bearing 21. The bearing 21 has a rotation axis 22 around which both the carrier arm 14 and the strut 16 are pivotably arranged. At a lower end of the carrier arm 14, associated with the base frame 13, a fourth bearing 23 is provided, with a rotation axis 24 which is provided on a guide 26 movable back and forth parallel to the base frame 13. A fifth bearing 27 is provided at the end of the carrier arm 14 opposite to the fourth bearing 23, and receives a load receiving means 29 pivotable around a rotation axis 28. The second, fourth and fifth bearings 21, 23, 27 are advantageously situated on the same straight line.

The lifting unit 17 is constituted in this embodiment as a hydraulic cylinder, but is not limited to this. The lifting unit 17 is advantageously arranged pivotably around the rotation axis 19 on an end toward the base frame 13. The end of the lifting unit 17 toward the base frame 13 can however also engage the base frame 13 at another place. The end of the lifting unit 17 remote from the base frame 13 engages the carrier arm 14 at a third bearing 31 with a rotation axis 32. The rotation axis 32 or third bearing 31 is arranged separately from the rotation axis 22 or second bearing 21. The configuration is advantageously provided such that in an inactive position of the lifting apparatus 11, an acute angle a is formed between an axis 34 running through the first and second bearings 18, 21 and an axis 36 of the lifting unit 17 running through the first and third bearings 18, 31. Furthermore, it is provided that the bearing 21 for the action of the strut 16 on the carrier arm 14 is constructed such that the second bearing 21 is arranged in the middle between the fourth bearing 23 and the fifth bearing 27. An isosceles triangle can thereby be formed throughout the whole lifting movement, between the first bearing 18, the second bearing 21 and the fourth bearing 23, whereby statically favorable force conditions are given. Furthermore, it can thereby be attained that an exclusively perpendicular lifting motion of the fifth bearing 27 takes place along the straight line 38. At the same time, it is of advantage for the lifting movement which runs in a straight line, or perpendicular to the base frame 18, or perpendicular to a floor 39, that the first bearing 18 and the fourth bearing 23 lie on a common plane.

The load receiver 29 has a surface 39 which is kept in a horizontal alignment during the whole lifting movement by means of a pull rod 41. The pull rod 41 engages directly on the load receiver 29 via a sixth bearing 42. Remote from this, the pull rod 41 is jointed to a lever 43 and forms a seventh bearing 44. The lever 43 is rigidly connected to the fourth bearing 23 of the axis 24. A so-called parallelogram guide can be given by this arrangement, and aligns the surface 39 of the load receiver 29 horizontally in every lifting position along the lifting movement. The guide rod 41 can advantageously be constructed at the same time as a cover which in the null position of the lifting apparatus forms a substantially closed surface of the base frame 13.

Figure 9A:
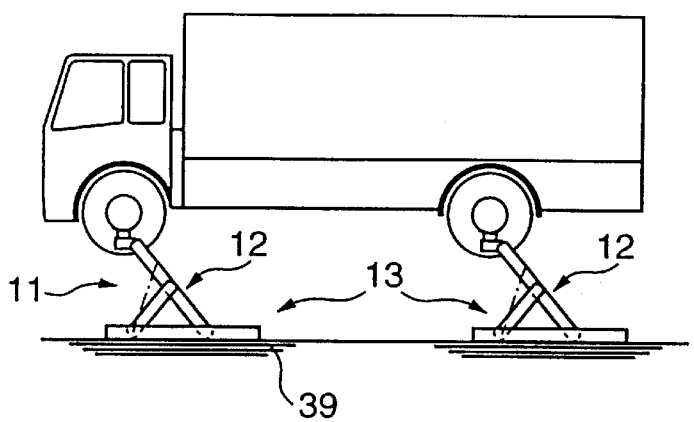
FIGS. 9a/b show a schematic side and front view of a first possibility of application.
Figure 10A:
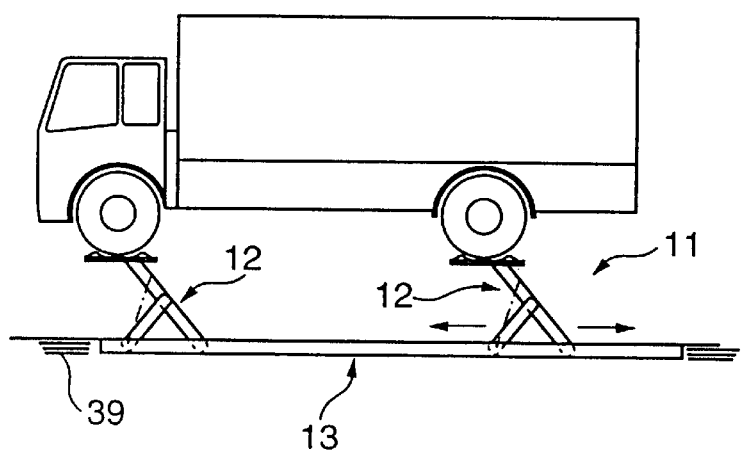
FIGS. 10a/b show a schematic side and front view of a further alternative embodiment and possible built-in construction.

The load receiver 29 engages a load to be lifted in a manner such that the force resultant 25 acts along the straight line 38 or engages the load receiver 29 outside a movement space which is determined by the first, fourth and fifth bearings 18, 23, 27. The load receivers 29 can for example engage axles of a motor vehicle (FIGS. 9a and b). Furthermore, load receivers 29 can be provided which engage under pneumatic tires of motor vehicles (FIGS. 10a and b). Furthermore, further load receivers, for example, plate-shaped load receivers 29 with damping elements, or U-shaped receivers 29, can be provided, in order to securely lift the corresponding loads.

The base frame 13 is advantageously constructed in a U-shape and has a left and right leg 47, 48, which are spaced apart by a preferably rectangular profile tube 49. This profile tube 49 is advantageously of flat rectangular construction, so that the load receiver 29 can on the one hand be formed in the required thickness to receive the load and on the other hand does not project beyond the clearance height otherwise conditioned by the scissors arrangement 12. The legs 47, 48 have a U-shaped profile which is arranged mutually facing, and the guide 26 runs in this U-shaped profile and has a guide block 51 on which are arranged two guide rollers 52. The guide rollers 52 are, in relation to the conicity of the running surface, advantageously adjusted to the corresponding contact surface of the U-shaped legs 47, 48. The rotation axes 53, 54 of the guide rollers 52 can be situated in one plane. However, these are advantageously at least slightly offset relative to each other, so that a nearly play-free guiding of the guide block 51 in the b ase frame 13 is made possible. The fourth bearing 23 is arranged between the rotation axes 53, 54 of the guide rollers 52. In an inoperative position according to FIG. 2, the rotation axes 19 of the first bearing 18 the rotation axis of the fourth bearing 23, and also the rotation axis 22 of the second bearing 21, are situated in a common plane. The legs 47, 48 can be adjusted to further kinds of bearings in the cross sectional geometry.

Figure 3:
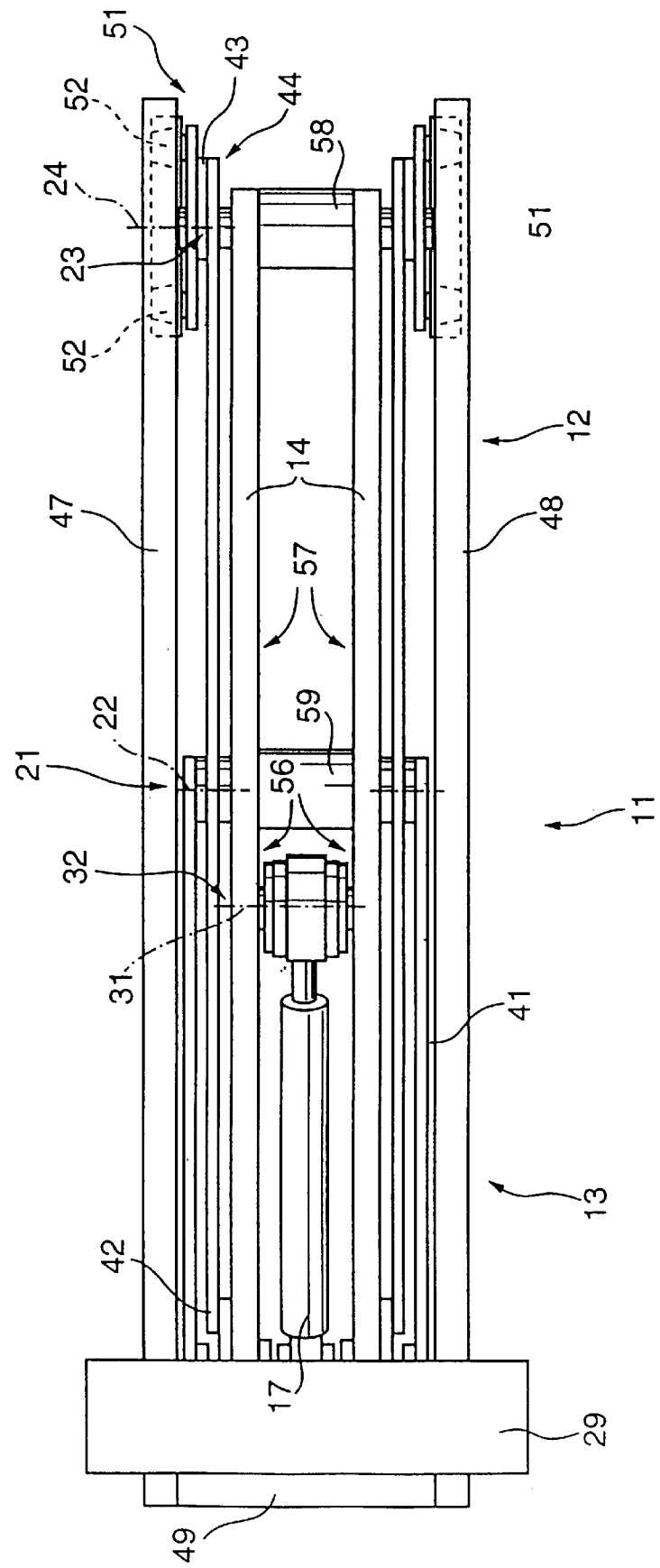
FIG. 3 shows a schematic plan view of the lifting apparatus according to the invention according to FIG. 2.

The carrier arm 14, which is divided by the second bearing 21 into a first carrier arm section 56 and a second carrier arm section 57, as the case may be, has a closed frame as can be seen in the plan view according to FIG. 3. The right and left carrier arm 14 are connected together in the fourth bearing 23 by the rigid connecting element 56, and in the region of the second bearing 27 by the load receiver 29, into a closed frame.

Figure 7:
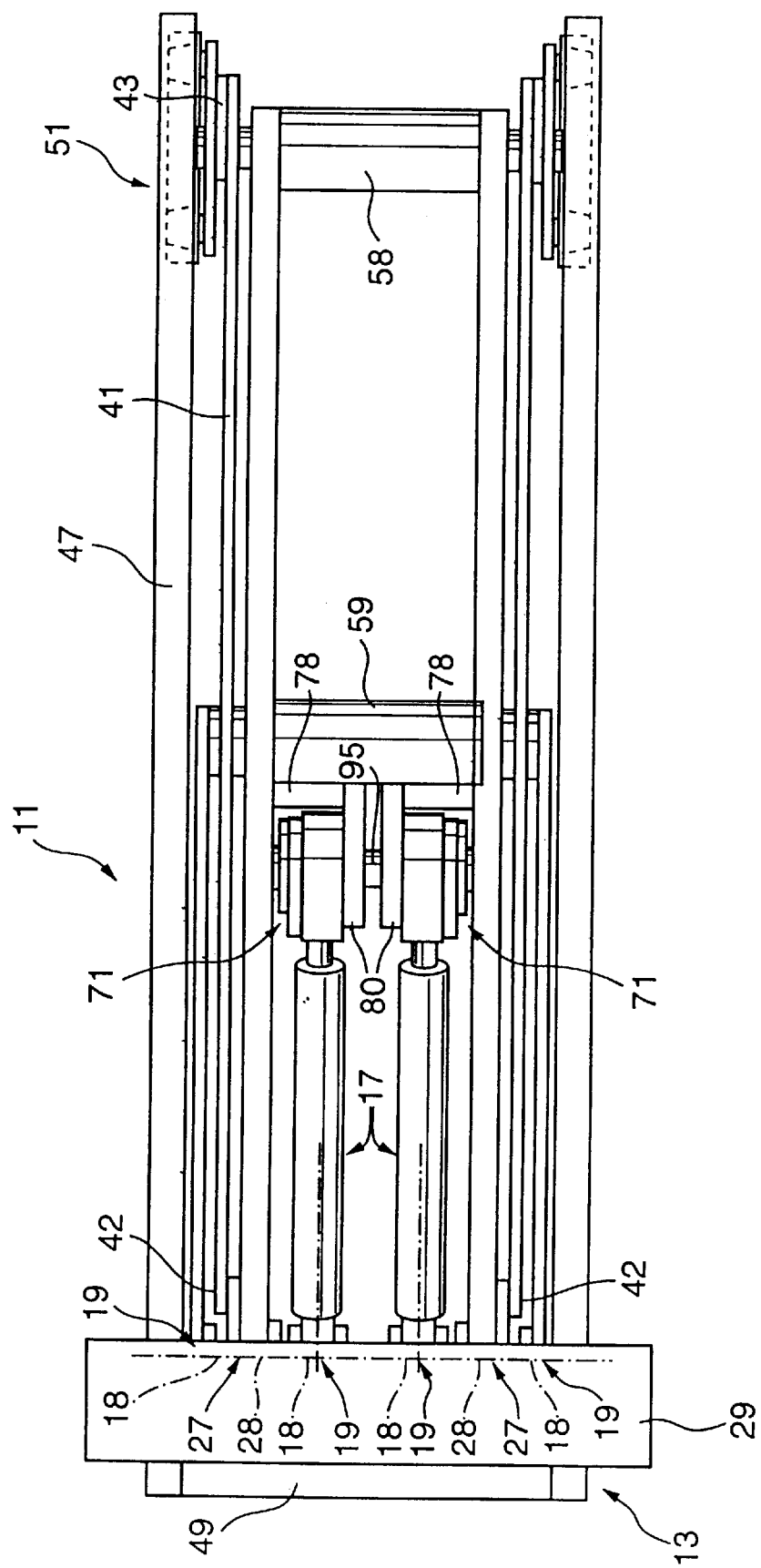
FIG. 7 is a schematic plan view of the alternative embodiment according to FIG. 6.

The lifting apparatus 11 according to FIGS. 1–3 can be constructed with a lifting cylinder or else with two lifting cylinders according to FIG. 7, or even with several lifting cylinders. In the configuration with several lifting cylinders, each individual lifting cylinder can be constructed smaller in diameter, whence the total overall height can be further reduced, as will become apparent from FIGS. 2 and 7. However, an acute angle is to be maintained between the axes 34 and 36 of the lifting apparatus 11 in an inactive position according to FIGS. 2 and 7. This angle can of course also be made smaller. In dependence on the geometrical dimensions, this can of course vary, without the principle of the mode of construction being departed from, according to which the third bearing 31 is spatially separated from the second bearing 21, and is arranged at least slightly above the axis 34 which runs horizontally.

The base frame 13 is constructed, particularly in the region of the profile tube 49, such that a free space is provided for the load receiver 29, so that a flat lifting apparatus 11 is made possible. Particularly in cases of application in which the lifting apparatus cannot be built into the floor, it is of particular advantage to be able to use lifting apparatuses 11 of flat construction according to the invention, since these can easily be driven over.

The lifting apparatus 11 according to FIGS. 1–3 can furthermore be further developed, in that a further half scissors is provided on the first carrier arm section 56, and engages the load receiver 29. A shortening of the total overall length can thereby be attained for an equal amount of lift. A further succession of such half scissors is likewise conceivable with the precondition that the static requirements are fulfilled.

Likewise the lifting apparatus 11 can be constructed as a double scissors with the features according to the invention.

An alternative embodiment is shown in FIGS. 4–7. FIGS. 1–3 are referred to regarding the features of like construction.

This embodiment has, with a maintained flat mode of construction, the advantage that because of the lever ratio, more favorable force conditions are given in order to introduce a lifting movement out of a null point position or out of an inactive position. The lifting unit 17 engages the carrier arm 14, or the first carrier arm section 56, via a rotary lever 71. This rotary lever is quasi interposed. The rotary lever 71 is arranged pivotably around a pivot axis 72 by means of an eighth bearing 73 on the first carrier arm section 56. A first lever arm extends from the rotation axis 72 to the third bearing 31, to which the lifting unit 17 is fastened. A second lever arm is extended from the rotation axis 72 to the pressure roller 74, which in a null point position abuts a holder, with a recess 76, mounted on the strut 16. The recess 76 has a support surface for the pressure roller 74, situated at least beneath the straight line 34.

At the beginning of the lifting movement, the lifting cylinder 17 can first be partially extended, before the rotary movement of the rotary lever 71 is blocked by a stop 77 which is arranged on the rotary lever 71 and which abuts a projection 78 associated with the second bearing. The acute angle α can thereby be enlarged, so that the force conditions for a lifting movement become more favorable. The required force enters corresponding to a cosine function in order to carry out the lifting movement. Thus a first lifting movement is first attained by means of using the lever ratio of the rotary lever 71. The course of this movement is shown, as an example, in an observation sequence from FIG. 6 to FIG. 5.

Figure 4:
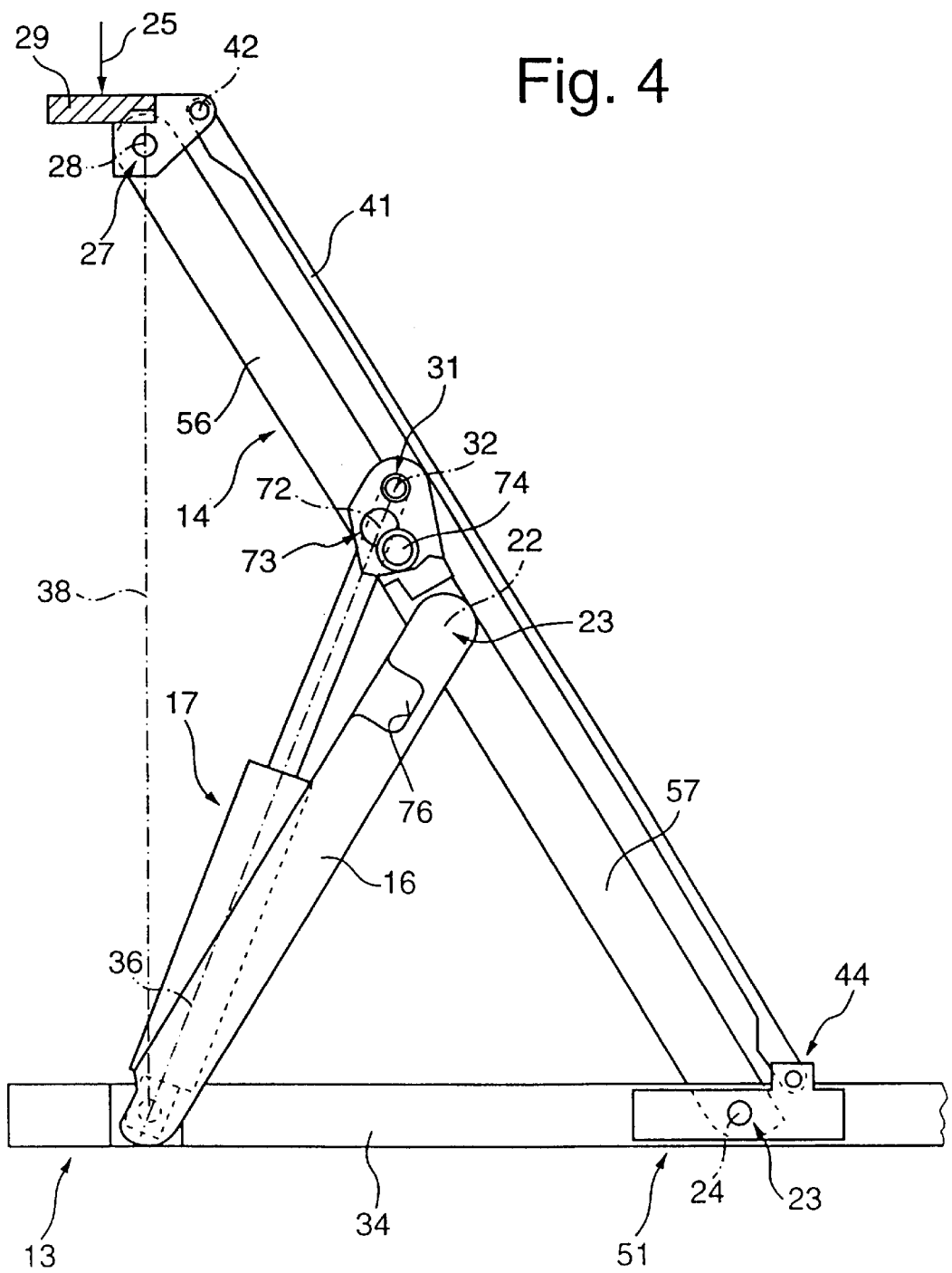
FIG. 4 shows a schematic side view of an alternative embodiment of the lifting apparatus according to the invention, in an extended position.

The further course of the lifting movement, shown for example in FIGS. 5 and 4, takes place exclusively by means of the cylinder. The rotary lever 71 is configured such that this does not hinder the further lifting movement of the lifting apparatus 11 or the rotary movement of the carrier arm 14. The stop 77 can advantageously be released from the projection 78 when the lifting cylinder is very far extended. The pressure roller 74 is advantageously constructed such that a fastening element of relatively large diameter is provided, which receives a plain roller bearing or the like, on which a hardened roller can advantageously revolve. The interposition of an easily running bearing can make possible a low-friction rolling of the pressure roller 74 in the recess 75, whereby the rotary motion can be facilitated. At the same time, corresponding dispositions can also be provided on the eighth bearing 73, so that the rotary lever 71 is easily pivotable.

The embodiment shown in FIGS. 4–7 can likewise be driven with only one lifting cylinder, by analogy with the embodiment according to FIGS. 1–3. Likewise, several lifting cylinders can also be used. Additional load receiving means 80 are provided so that the forces are better transmitted to the carrier arm 14 during the lifting movements of the cylinder 17. Furthermore, a common bearing shaft 95 can be provided. The embodiment shown in FIGS. 4–7 has, for example, a plain bearing as the guide. The pull rod 41 is directly, pivotably attached to this plain bearing. The pull rod 41 is furthermore situated above the carrier arm 14 in the null point position and can be provided as a cover in order to constitute the lifting apparatus as substantially closed.

Figure 8:
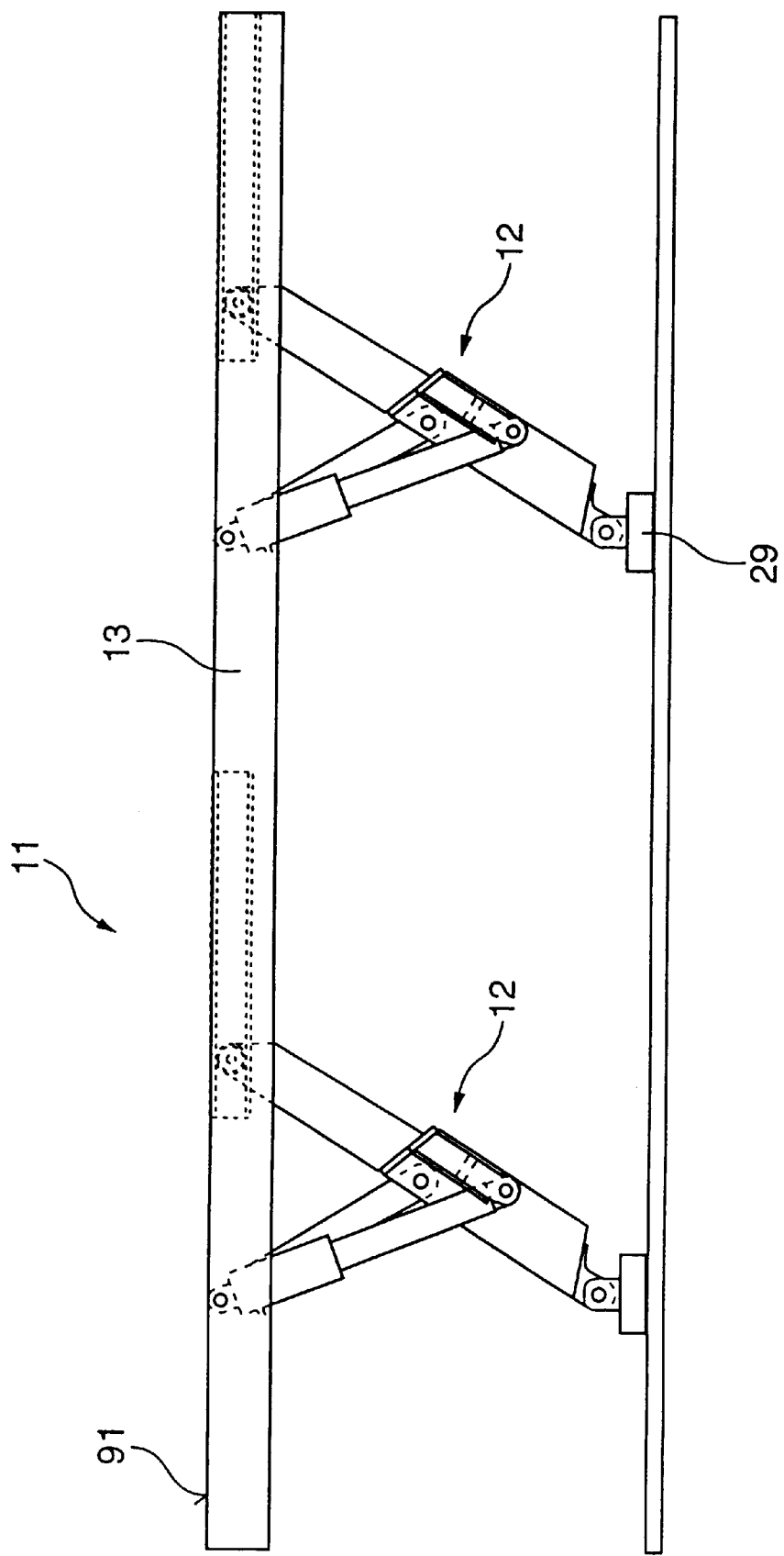
FIG. 8 shows an alternative arrangement of the embodiment according to the invention in FIGS. 1–3.

FIG. 8 shows an alternative arrangement of the embodiment according to the invention according to FIGS. 1–3. The load receiver 29 is for example fixed firmly to the floor, so that the base frame 13 can be moved up and down by the scissors arrangement 12. The base frame 13 advantageously has a U-shaped profiling at its upper side 91 in this embodiment, so that a rail can be formed and motor vehicles can securely drive onto the base frame 13. The spacing of the scissors arrangements 12 from each other can be provided in dependence on the length of the loads to be lifted. Furthermore, three or more scissors arrangements 12 can act on a rail, in dependence on the load to be lifted.

Figure 9B:
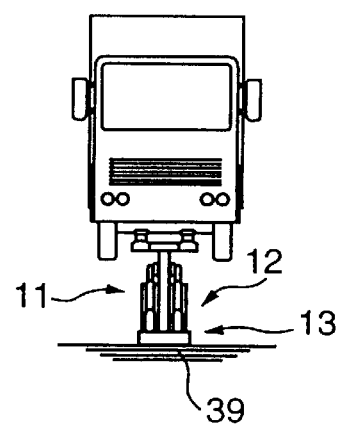

Examples of applications of the embodiments of the lifting apparatus 11 according to the invention are shown in FIGS. 9–11. FIGS. 9a and 9b show an example of a use of the lifting apparatus 11, in which the lifting apparatus 11 is arranged on a workshop floor 39. The lifting apparatuses 11 can be provided as both stationary and movable. For example, the arrangement may be that only one of the two lifting apparatuses 11 is stationary, so that the second lifting apparatus 11 can be adjusted to the vehicle length or the like. The lifting apparatus 11 according to FIGS. 9a and 9b is of double-cylindered constitution. The load receiving means 29 is made shorter in width than the track width of a motor vehicle, so that with suitable reception an action on the axles of the motor vehicle is made possible. It can furthermore be provided that pivot levers are provided on the load receiver 29, and can act, for example, on the frame of the vehicle.

Figure 10B:
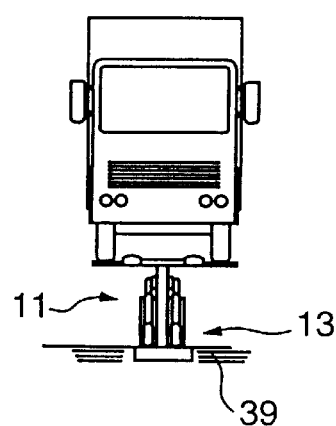

FIGS. 10a and 10b show, by way of example, a lifting apparatus 11 which is let into the workshop floor. Here again it can be provided that one of the two lifting apparatuses 11 is fixed and the other is movable to left and right as shown by the arrows. Advantageously, both scissors arrangements 12 are arranged displaceably and mutually spaced apart, to provide a high variability. The load receiving means 29 in FIGS. 10a and 10b is for example configured such that these engage under the tires of a vehicle.

Figure 11A:
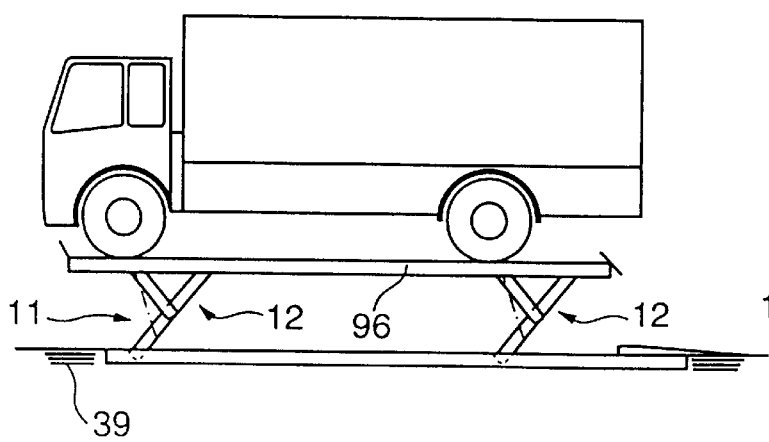
FIGS. 11a/b show a schematic side and front view of a further alternative case of application of the lifting apparatus according to the invention.
Figure 11B:
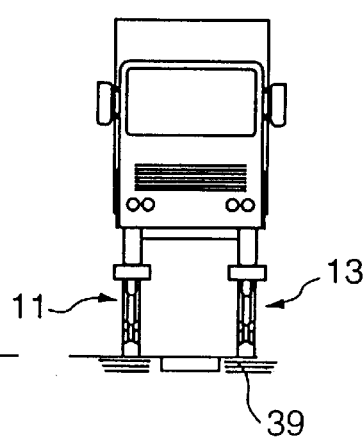

A further alternative is shown in FIGS. 11a and 11b. The scissors arrangements 12 of the lifting apparatus 11 are again let into a foundation in the workshop floor 39. These can be optionally displaceable at a spacing from each other. In this embodiment, for example, a single-cylinder version is shown, in which there is one scissors arrangement 12 per pneumatic tire. For very heavy loads, a double-cylinder or multicylinder embodiment per tire is provided. It can likewise be advantageously provided that the left-hand scissors arrangement 12 has a lifting unit 17 and the right-hand scissors arrangement is constituted without a lifting unit. The connection between the two or more scissors arrangements 12 can be constituted by a connecting rod 98 or as a rail or the like.

The combination of the individual features for the design of a lifting apparatus 11 for the corresponding load to be used is optional. In the embodiments according to FIGS. 9–11, it is advantageously provided that a common drive takes place of all the lifting units 17 in use, so that a uniform lifting of the load can take place. The limit switches required for such an apparatus for monitoring the lifting movement and also for fulfilling the safety regulations are not shown in detail. It can likewise be provided that the lifting apparatus is used such that, for example, the vehicle is lifted only at the front end or rear end, in order to carry out corresponding work on it. The lifting apparatus according to the invention can also be provided, supplemented to that effect.

I claim:

1. A lifting apparatus with at least one scissors arrangement (12) and a base frame (13), comprising
    a first bearing (18) with a rotation axis (19),
    a strut (16) arranged to be pivotable around said rotation axis (19),
    a carrier arm (14) that has a second bearing (21) in common with said strut (16), said strut (16) dividing said carrier arm (14) into a first and a second carrier arm section (56, 57), said second carrier arm section (57), forming a triangle with said strut (16) and said base frame (13),
    a guide (26) that has a fourth bearing (23) arranged on said guide (26) for receiving said second carrier arm section (57), which guide (26) can move back and forth on said base frame (13),
    a load receiver (29) arranged on a fifth bearing at a free end of said first carrier arm section (56);
    at least one lifting unit (17) that acts on said carrier arm (14); and
    a parallelogram guide (14, 41) with which said load receiver (29) is aligned horizontally,
    in which a resultant force (25) acting on said load receiver (29) runs along a straight line (38) extending between said first and fifth bearings (18, 27) or is situated outside a movement space of said scissors arrangement (12) circumscribed by said first, fourth and fifth bearings (18, 23 and 27).

2. The lifting apparatus according to claim 1, in which said parallelogram guide (41) comprises a pull rod, with a lifting movement running through said fifth bearing (27).

3. The lifting apparatus according to claim 1, in which said parallelogram guide comprises at least a further scissors arrangement coupled with a connecting element 59 acting on said first scissors arrangement (12), said further scissors arrangement being with or without a lifting unit.

4. The lifting apparatus according to claim 1, in which said lifting unit (17) is arranged on said first carrier arm section (56) at a third bearing (31) spaced from said second bearing (21) so that at least in an unextended position of said scissors arrangement an axis (34) that extends between said rotation axis (19) of said first bearing (18) and said rotation axis (22) of said second bearing (21) is arranged at an acute angle a to a longitudinal axis (36) of said lifting unit (17).

5. The lifting apparatus according to claim 4, in which said third bearing unit (31) is situated outside an axis that extends between said second bearing (21) and said fourth bearing (23).

6. The lifting apparatus according to claim 1, in which said lifting unit (17) is pivotably arranged on said rotation axis (19) of said first bearing (18).

7. The lifting apparatus according to claim 1, in which the length of said strut (16) corresponds to the length of at least one of said first and second carrier arm sections (56, 57) of said carrier arm (14).

8. The lifting apparatus according to claim 1, further comprising a pull rod (41) arranged parallel to said carrier arm (14) and pivotably arranged at one end on said load receiver (29) separated from said fifth bearing (27) and connected to said fourth bearing (23) at an opposite end by a pivot lever (43).

9. The lifting apparatus according to claim 1, further comprising a plurality of scissors arrangements (12) with at least one lifting unit (17) arranged on at least one base frame (13).

10. The lifting apparatus according to claim 1, in which said base frame (13) comprises a rail for a vehicle, a platform, a receiver and the like, and said load receiver (29) is arranged on a floor (39).

11. The lifting apparatus according to claim 1, in which said second, fourth, and fifth bearings (21, 23 and 27) are situated on a common axis of said carrier arm (14).

12. The lifting apparatus according to claim 1, in which said fifth bearing (27) is movable along a straight line (38) at right angles to a line connecting said first and fourth bearings (18, 23).

13. The lifting apparatus according to claim 1, in which said base frame (13) comprises a U-shaped frame having two legs (47, 48) aligned mutually parallel.

14. The lifting apparatus according to claim 14, in which said two legs of said U-shaped frame have a U-shaped profile.

15. The lifting apparatus according to claim 1, in which said guide (26) comprises a guide block (51) having at least two guide rollers (52) or comprises a plain bearing.

16. The lifting apparatus according to claim 1, further comprising a guide block (51) connected to said fourth bearing (23) having at least two guide rollers (52) that are guided in a U-shaped profile leg (47, 48) of said base frame (13).

17. The lifting apparatus according to claim 16, in which said guide rollers (52) are arranged on said guide block (51) such that their rotation axes do not lie on a common horizontal plane.

18. The lifting apparatus according to claim 12, in which a rotation axis (24) of said carrier arm (14) lies on said fourth bearing (23).

19. The lifting apparatus according to claim 1, in which said lifting unit (17) comprises a hydraulic cylinder and has at least one lifting cylinder.

20. The lifting apparatus according to claim 1, in which said carrier arm (14) comprises a closed frame with a right-hand and left-hand carrier arm strut connected together at said fourth bearing (23) by a connecting piece (58), and at said second bearing (21) by a rigid connecting piece (59), and at said fifth bearing (27) by said load receiver (29).

21. The lifting apparatus according to claim 1, in which at least one lifting unit (17) is arranged between said strut (16) and a left-hand and right-hand carrier arm (14).

22. The lifting apparatus according to claim 1, comprising a mirror-image configuration along a longitudinal axis of said scissors arrangement (12) and said base frame (13).

* * * * *